(12) United States Patent
Bovet et al.

(10) Patent No.: US 11,550,420 B2
(45) Date of Patent: *Jan. 10, 2023

(54) QUICK REVIEW OF CAPTURED IMAGE DATA

(71) Applicant: Apple Inc., Cupertino, CA (US)

(72) Inventors: Simon I. Bovet, Zurich (CH); Elliott Harris, Cupertino, CA (US); Andreas J. Karlsson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,475

(22) Filed: Mar. 24, 2020

(65) Prior Publication Data

US 2020/0225834 A1 Jul. 16, 2020

Related U.S. Application Data

(63) Continuation of application No. 15/172,388, filed on Jun. 3, 2016, now Pat. No. 10,628,010.

(60) Provisional application No. 62/171,683, filed on Jun. 5, 2015.

(51) Int. Cl.
G06F 3/0488 (2022.01)
G06F 3/041 (2006.01)
(Continued)

(52) U.S. Cl.
CPC .......... *G06F 3/0416* (2013.01); *G06F 3/0488* (2013.01); *G06F 3/04845* (2013.01);
(Continued)

(58) Field of Classification Search
CPC .. G06F 3/0416; G06F 3/04845; G06F 3/0488; G06F 3/01; G06F 2203/048;
(Continued)

(56) References Cited

U.S. PATENT DOCUMENTS 8,745,500 B1 * 6/2014 Kostello ................ G11B 27/34
715/723
2007/0011623 A1 * 1/2007 Billmaier ............ H04N 21/482
715/784

(Continued)

FOREIGN PATENT DOCUMENTS

WO WO-2013169870 A1 * 11/2013 ........... G06F 3/0416

*Primary Examiner* — Jennifer N Welch
*Assistant Examiner* — KC Chen
(74) *Attorney, Agent, or Firm* — Invoke

(57) ABSTRACT

A method may include presenting an image capture user interface on a display device of a multipurpose device including a live view portion configured to display a live view of image data currently sensed by an image capture device of the multipurpose device and a recall portion configured to display a thumbnail preview of stored image data most recently captured by the image capture device; receiving an indication of a first touch input on the display device, the first touch input starting at a first position on or near the recall portion of the user interface; receiving an indication of a swiping gesture from the recall portion to a second position with contact being maintained of the first touch input; and in response to the first touch input, displaying an enlarged preview of the stored image data, the enlarged preview being larger in size than the thumbnail preview.

20 Claims, 9 Drawing Sheets

(51) Int. Cl.
    *G11B 27/34*     (2006.01)
    *G06F 3/04845*     (2022.01)
    *H04N 5/232*     (2006.01)
    *G06F 3/01*     (2006.01)

(52) U.S. Cl.
    CPC ......... *G11B 27/34* (2013.01); *H04N 5/23216* (2013.01); *G06F 3/01* (2013.01); *G06F 2203/048* (2013.01); *G09G 2340/04* (2013.01); *G09G 2340/14* (2013.01)

(58) Field of Classification Search
    CPC ............... G11B 27/34; H04N 5/23216; G09G 2340/14; G09G 2340/04
    See application file for complete search history.

(56) References Cited

U.S. PATENT DOCUMENTS

| | | |
|---|---|---|
| 2008/0205869 A1 | 8/2008 | Nose |
| 2009/0002326 A1 | 1/2009 | Pihlaja |
| 2010/0302409 A1 | 12/2010 | Matas et al. |
| 2011/0109581 A1 | 5/2011 | Ozawa et al. |
| 2011/0185320 A1 | 7/2011 | Hinckley et al. |
| 2012/0133822 A1 | 5/2012 | Kawai |
| 2013/0055119 A1 | 2/2013 | Luong |
| 2013/0222663 A1* | 8/2013 | Rydenhag .......... H04N 5/23216 348/E5.022 |
| 2014/0282150 A1* | 9/2014 | Wagner ................. G06F 3/0482 715/765 |
| 2014/0354845 A1* | 12/2014 | Molgaard ............ H04N 5/2621 348/222.1 |
| 2014/0365893 A1 | 12/2014 | Gao et al. |
| 2015/0334291 A1* | 11/2015 | Cho .................... G06F 3/04845 348/222.1 |
| 2015/0356355 A1* | 12/2015 | Oguchi ................ G11B 27/105 386/230 |
| 2016/0018913 A1 | 1/2016 | Zhang |
| 2016/0139595 A1* | 5/2016 | Yang .................... G05D 1/0044 701/2 |
| 2016/0291731 A1 | 10/2016 | Liu et al. |
| 2016/0306541 A1 | 10/2016 | Fang |
| 2016/0357415 A1 | 12/2016 | Bovet et al. |

* cited by examiner

QUICK REVIEW OF CAPTURED IMAGE DATA

INCORPORATION BY REFERENCE; DISCLAIMER

Each of the following applications are hereby incorporated by reference: application Ser. No. 15/172,388 filed on Jun. 3, 2016, application No. 62/171,683 filed on Jun. 5, 2015. The Applicant hereby rescinds any disclaimer of claim scope in the parent application(s) or the prosecution history thereof and advises the USPTO that the claims in this application may be broader than any claim in the parent application(s).

TECHNICAL FIELD

Embodiments described herein generally relate to user interface and in particular, but without limitation, to user interfaces for quick review of captured image data.

BACKGROUND

To capture a picture on a mobile phone a user may first open an image capture application, such as a camera application. The user may be presented with an interface that shows data currently sensed by an image sensor on the mobile device. The user may then activate a user interface element or press a physical button to instruct the mobile device to capture a still image or video. A small thumbnail of the captured image data may be shown in the image capture application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
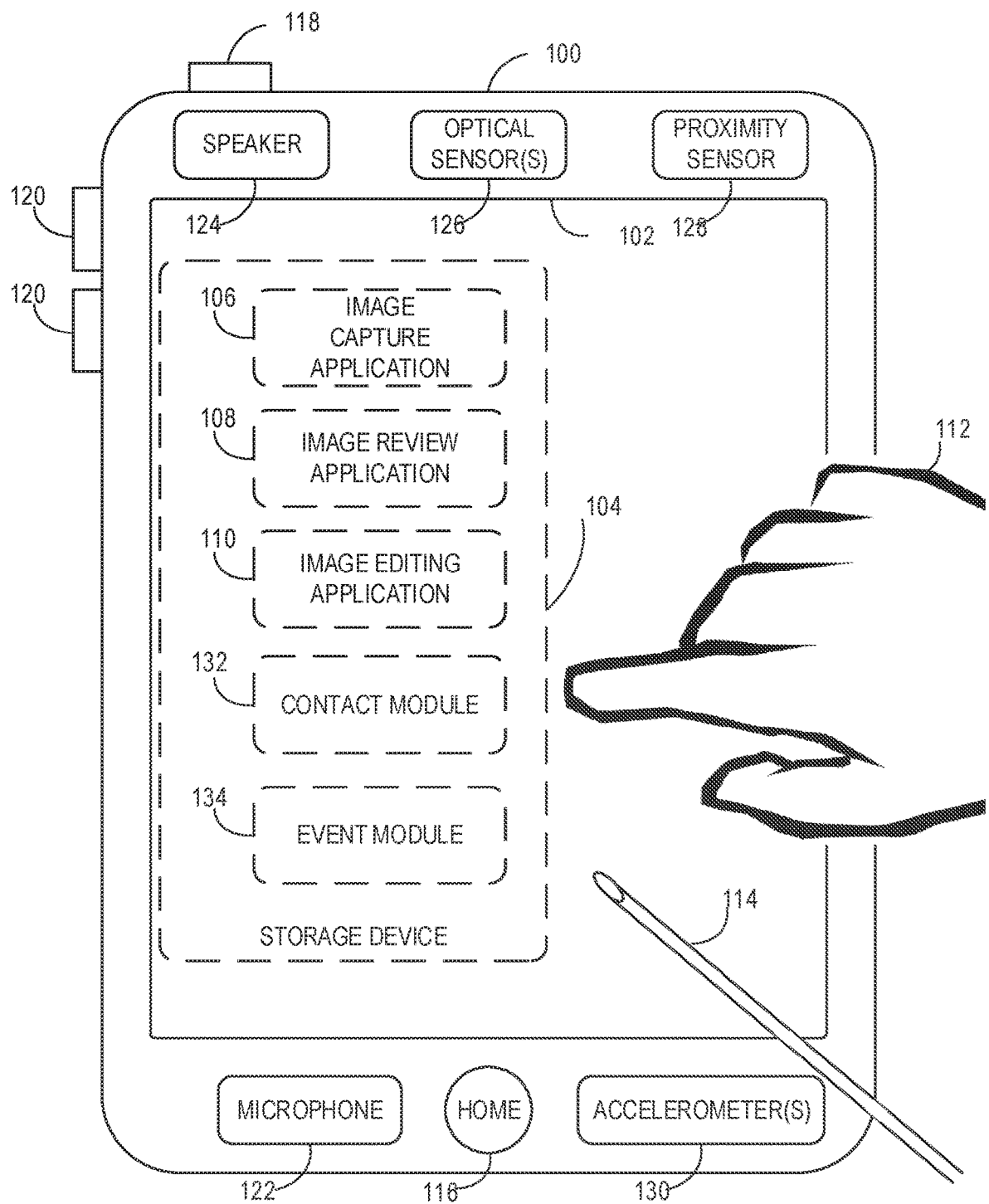
FIG. 1 illustrates a portable multifunction computing device, according to various embodiments.

When a user takes a picture on his or her mobile device, the user may wish to quickly determine if the composition and sharpness is correct, and if not, take another picture. Capturing and reviewing an image on a mobile device may involve a number of operations by the user. For example, the user may first open an image capturing application to take a picture. After instructing the mobile device to take the picture, the image capturing application may present a thumbnail preview of the picture. In order to see a larger version of picture, to check if the composition was correct, a user may tap the thumbnail to be brought to an image editing interface. The user may need another interaction to zoom into the image to see if the sharpness of the image was correct. Yet an additional interaction—such as clicking on a user interface element—may be needed to return to the image capturing application. During these interactions to review an image, the opportunity to take another picture may be lost for fast moving subjects.

In various examples describe herein, a touch gesture in which contact is maintained with a touch screen may be used to alleviate the need for tap interactions to switch between an image capture application, a review interface, and an editing application. For example, within an image capture application, a user may begin a touch gesture on a thumbnail of a recently taken picture. While maintaining contact with the touch screen, the user may continue the gesture to a second position. At this point, the image capture application may be replaced with an enlarged version of the picture. Additional interfaces or controls may be displayed based on the gesture continuing to a third position as described herein.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Electronic devices with user input mechanisms that can simulate touch interface gestures, such as a mouse, are also within the general scope of this disclosure.

FIG. 1 illustrates a portable multifunction device 100 having a touch screen 102 in accordance with various embodiments. In an example, the touch screen 102 displays user interfaces (UI) containing one or more graphical elements (e.g., icons, text, pictures, videos, buttons, also referred to simply as graphics). One or more UIs may be associated with an application stored on a storage device 104 of the portable multifunction device 100. For example, different UIs may be used for an image capture application 106, an image review application 108, and an image editing application 110. A user may select or interact with one or more graphics by making a gesture on the graphic for example, with one or more fingers 112 (not drawn to scale in the figure) or one or more styluses 114 (not drawn to scale in the figure).

In some embodiments, selection of one or more graphics of a UI occurs when the user breaks contact with the one or more graphic elements. In some embodiments, a gesture may include one or more taps, one or more swipes (e.g., from left to right, right to left, upward and/or downward) and/or a rolling of a finger (e.g., from right to left, left to right, upward and/or downward) that has made contact with device 100. In some embodiments, inadvertent contact with a graphical element may not select that element. For example, a swipe gesture that sweeps over an application icon may not select the corresponding application when the gesture corresponding to selection is a tap.

The device 100 may also include one or more physical buttons, such as "home" or menu button 116. The menu button 116 may be used to navigate to an application in a set of applications (e.g., applications 106-110) that may be executed by at least one processor on device 100. In some embodiments, the menu button 116 is implemented as a soft key in a UI displayed on the touch screen 102. In an embodiment, the device 100 includes additional buttons such as push button 118 for powering the device on/off and locking the device and volume adjustment button(s) 120. Device 100 may further include a microphone 122, speaker(s) 124, and sensors such as an optical sensor(s) 126, a proximity sensor 128, and an accelerometer 130.

Optical sensor 126 may include charge-coupled device (CCD) or complementary metal-oxide semiconductor (CMOS) phototransistors. Optical sensor 126 receives light from the environment, projected through one or more lens, and converts the light to data representing an image. In conjunction with the image capture application 106 (also called a camera module), optical sensor 126 may capture still images or video. In some embodiments, an optical sensor is located on the back of the device 100, opposite the touch screen display 102 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

In various examples the touch screen 102 provides an input interface and an output interface between the device and a user. The touch screen 102 may have a touch-sensitive surface, sensor or set of sensors that accepts input from the user based on contact (e.g., using a finger 112 or stylus 114). The touch screen 102 and a display controller (not shown) may detect contact (and any movement or breaking of the contact) on the touch screen 102 and convert the detected contact into interaction with user-interface elements that are displayed on the touch screen 102. In an exemplary embodiment, a point of contact between the touch screen 102 and the user corresponds to a finger of the user.

The touch screen 102 may use LCD (liquid crystal display) technology, LPD (light emitting polymer display) technology, or LED (light emitting diode) technology, although other display technologies may be used in other embodiments. The touch screen 102 and display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 102. In an exemplary embodiment, projected mutual capacitance sensing technology is used, such as that found in the iPhone®, iPod Touch®, and iPad® from Apple Inc. of Cupertino, Calif.

In various examples, contact module 132 may detect contact with the touch screen 102 (in conjunction with a display controller) and other touch sensitive devices (e.g., a touchpad or physical click wheel). The contact module 132 may include various software components executable on at least one processor for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact).

In an example, the contact module 132 receives contact data from the touch-sensitive surface of the touch screen 102. Determining movement of the point of contact, which may be represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/ multiple finger contacts). In some embodiments, the contact module 132 and display controller detect contact on a touchpad.

The contact module 132 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

In various examples, the event module 134 receives event data and determines what components should be notified of the event data. Event data may include data from the contact module 132 concerning gestures that have been inputted by the user. Event data may also include data sensed or received by sensor of the device 100. In various examples, the event module 134 periodically polls the sensors or modules to receive the event data.

The event module 134 may determine which application to notify about a gesture made on the touch screen 102 based on which application is currently being displayed on the touch screen 102. For example, if the image capture application 106 is open, the event module 134 notifies the image capture application 106 of the gesture and the details of the gesture. For example, in a message transmitted to the image capture application 106, the event module 134 may indicate the type of gesture (e.g., swipe, finger tap, etc.), where the contact points made by the user as well as direction, speed, and duration of the gesture.

Applications may have defined event handlers based on the different gestures and where the gesture is made. For example, the image capture application 106 may execute instructions to instruct the optical sensor 126 to capture image data when a user taps a specific graphic. Additional details of how the applications 106-110 may handle data received from the event module 134 are described herein. Furthermore, although applications 106-110 are discussed as separate applications with specific UIs, the UIs may be part of a single application. Thus, a single application may be used to take pictures, review the pictures, and edit the pictures.

Figure 2:
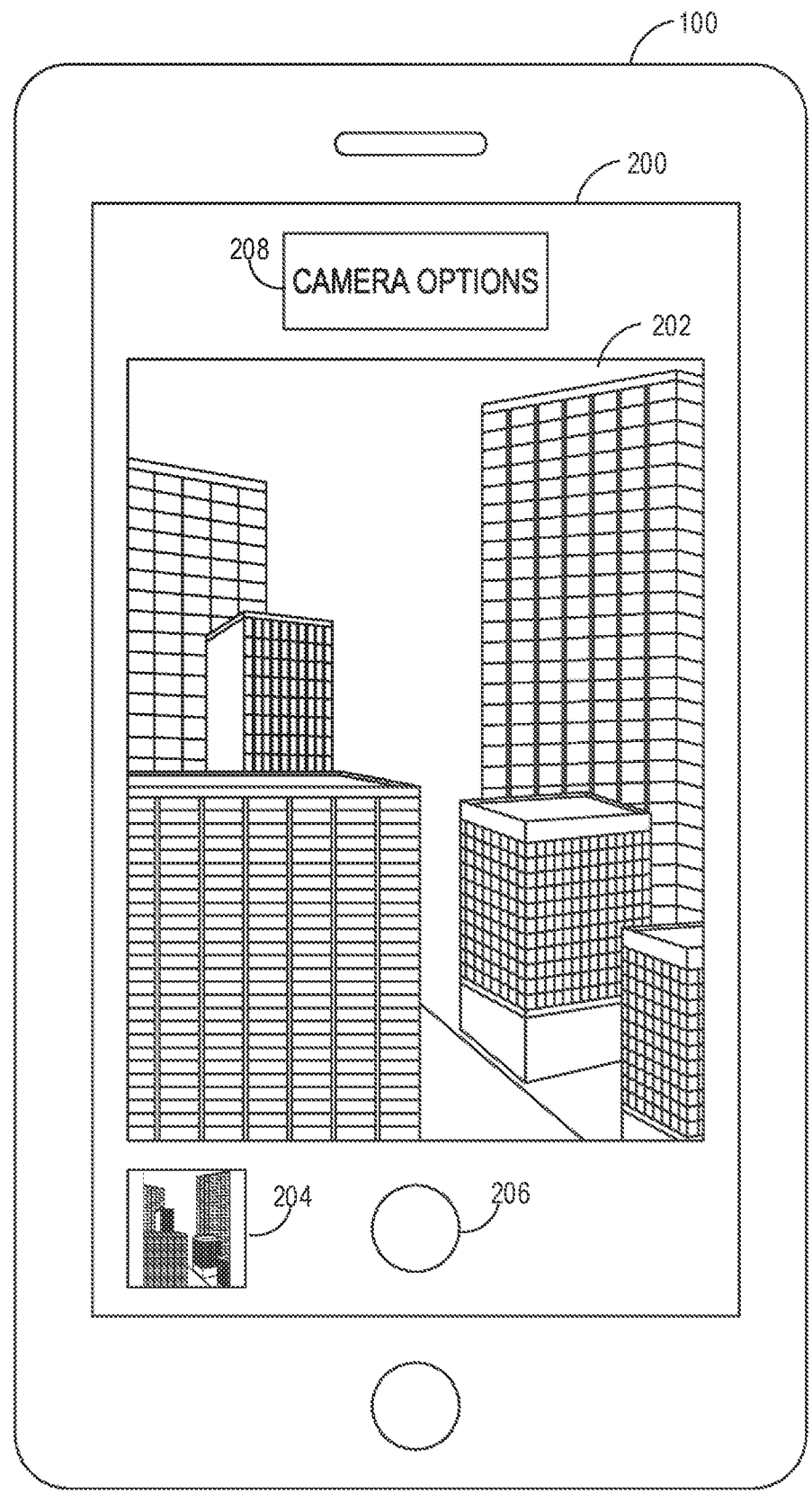
FIG. 2 illustrates an image capture application on a mobile device, according to various embodiments.

FIG. 2 illustrates an image capture application on a mobile device, according to an example embodiment. FIG. 2 illustrates a portable multifunction device 100 with a touch screen. The portable multifunction device 100 may be the same device as illustrated in FIG. 1, in an example. Within FIG. 2, an image capture user interface 200 may be presented on the touch screen that includes a live view portion 202, a recall portion 204, an image capture graphic 206, and camera options 208. The locations of the illustrated graphics in FIG. 2 as well as the graphics in FIGS. 3-7 are example locations and other layouts may be used. For example, the camera options 208 may be beneath the live view portion 202 and the recall portion may be above the live view portion 202.

In an example, the image capture user interface 200 may be part of the image capture application 106. The image capture application may be used by a user of the device 100 to take still images or videos (collectively, image data) using the optical sensor(s) 126. Before image data is captured and stored on a storage device, a user may see a live preview of image data currently sensed by an optical sensor. For example, in FIG. 2, the live portion 202 displays currently sensed data of a number of buildings.

A user may use a touch input gesture on the image capture graphic 206 to store the image data currently sensed by the optical sensor. The contact module 132 may detect when a user begins a touch input on the image capture graphic 206, which in turn may pass the detection to the event module 134. The event module 134 may then transmit a message to the image capture application 106 of the touch input gesture. Finally, an event handler of the image capture application may define a function to execute when it receives an indication that a touch input gesture has been made on the image capture graphic 206. When executed, the function may store image data currently sensed by an optical sensor to a storage device of the device 100.

In various examples, the function may also store metadata about the image data such as what area of the image data was focused on by the optical sensor and when the image was taken. For example, a user may define a focus point by make a touch input gesture on a portion of the live portion 202. In an example, if no touch input gesture is received on the live view portion 202, the image capture application may pick a focus point.

After capturing the image data, a thumbnail preview of the most recently captured image data may be generated. The thumbnail preview may maintain the ratio of captured image data or may crop the image data (e.g., to a square ratio). The thumbnail preview may then be displayed in the recall portion 204 where it may be interacted with by the user with one or more touch input gestures as described below.

Figure 3:
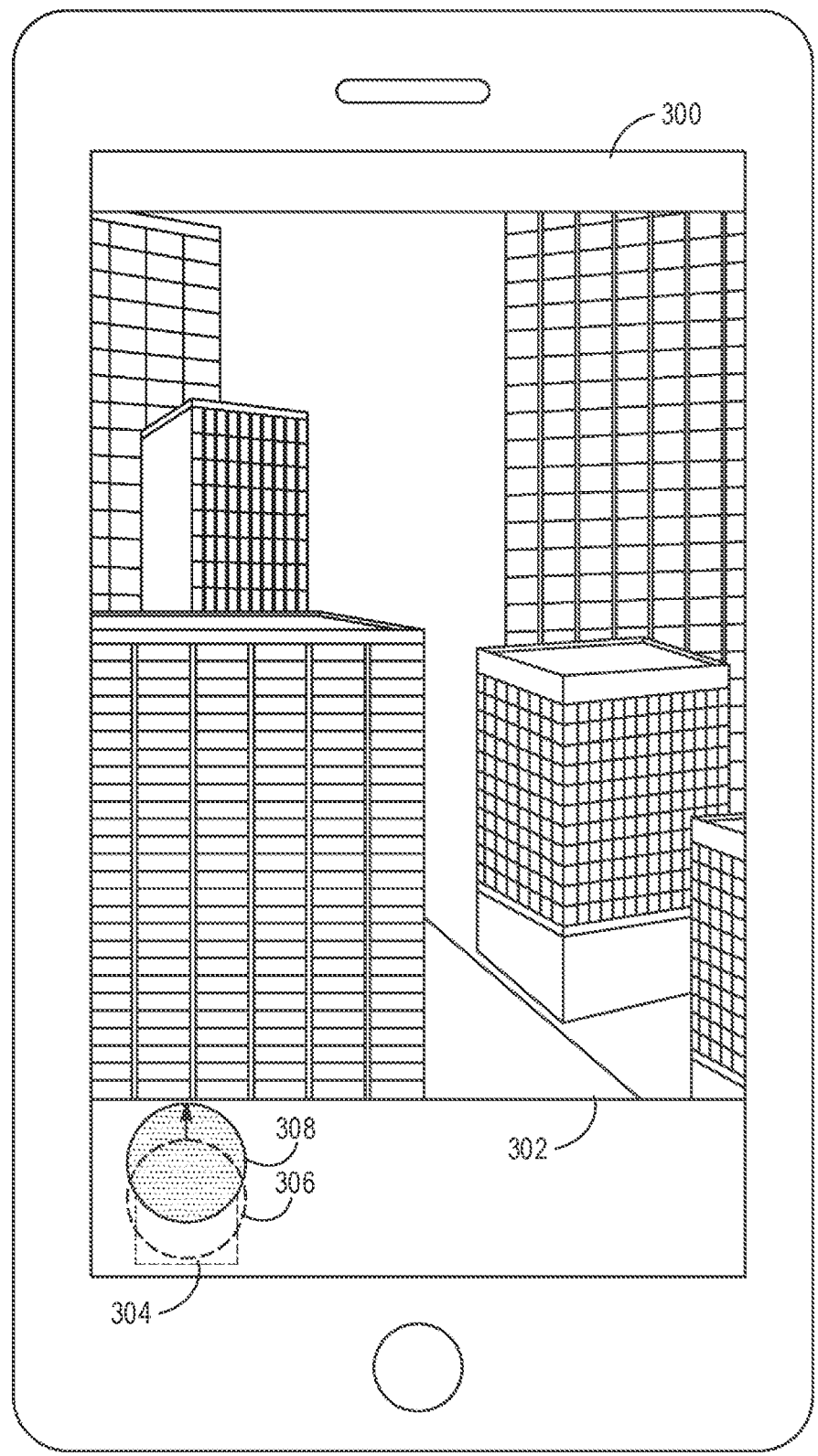
FIGS. 3-6 illustrates various views of a review interface on a mobile device, according to various embodiments.

FIG. 3 illustrates an example of a review interface 300 on a mobile device, according to an example embodiment. The review interface may be part of the image review application 108. In an example, the review interface is part of the image capture application 106 or image editing application 110 separately from, or in addition to the image review application 108. The review interface may include an enlarged preview 302 of recently captured image data. In an example, the enlarged preview 302 maintains the aspect ratio of the recently captured data.

In an example, the components of the image capture user interface 200 are not displayed in the review interface 300. However in other examples, the review interface 300 may share one or more graphics from the image capture user interface 200. For example, the recall portion 204 may be displayed.

The enlarged preview 302 may be presented in response to a touch input made by a user of the portable multifunction device 100. The touch input may begin—via a user's finger or stylus—at a first position on or near the recall portion 204 of the image capture user interface 200. Without breaking contact with the touch screen display 102, a user may make a swipe gesture to a second position. In an example, while contact is maintained with the touch screen display 102, the image capture user interface 200 is replaced with the review interface 300.

For illustration purposes, the above described touch input is illustrated in FIG. 3 as follows. The recall portion 204 is outlined by box 304, the first position as outlined circle 306, and second position as shaded circle 308—the box and circles may not be show to the user. The contact module 132 may determine whether or not the first position is considered on or near the recall portion 204 and transmit, via event module 134 an indication to image capture application 106. The contact module 132 may further determine that the touch input continued to the second position. The image capture application 106 may then execute the event handler associated with a user beginning a swipe gesture on the recall portion 204 and continuing to a second position to present the review interface 300 with the enlarged preview 302.

In an example, the enlarged preview 302 maintains the original aspect ratio of the captured image enlarged to fill the available space within the review interface 300, similar to what is illustrated in FIG. 3. In another example, the enlarged preview 302 is enlarged to completely fill the available space in review interface 300 without regard for maintaining original aspect ratio. In this example, the enlarged preview 302 may crop a portion of the original picture to fill the available review interface 300, such as if the original image were in landscape orientation and the review interface 300 is in portrait orientation during review. In yet other examples, the enlarged preview 302 may be magnified by a pre-determined amount for display within the review interface 300.

While the direction of the swipe gesture is illustrated as going from the recall portion 204 towards the live view portion 202, other directions may be used. For example the second position may be to the side or below of the recall portion 204. In an example, the enlarged preview 302 is presented in response to receiving an indication that a touch and hold gesture was made on the recall portion 204. For example, a user may maintain contact at the same or substantially the same place on the recall portion 204 for a predetermined amount of time at which point the review interface 300 may be displayed.

Figure 4:
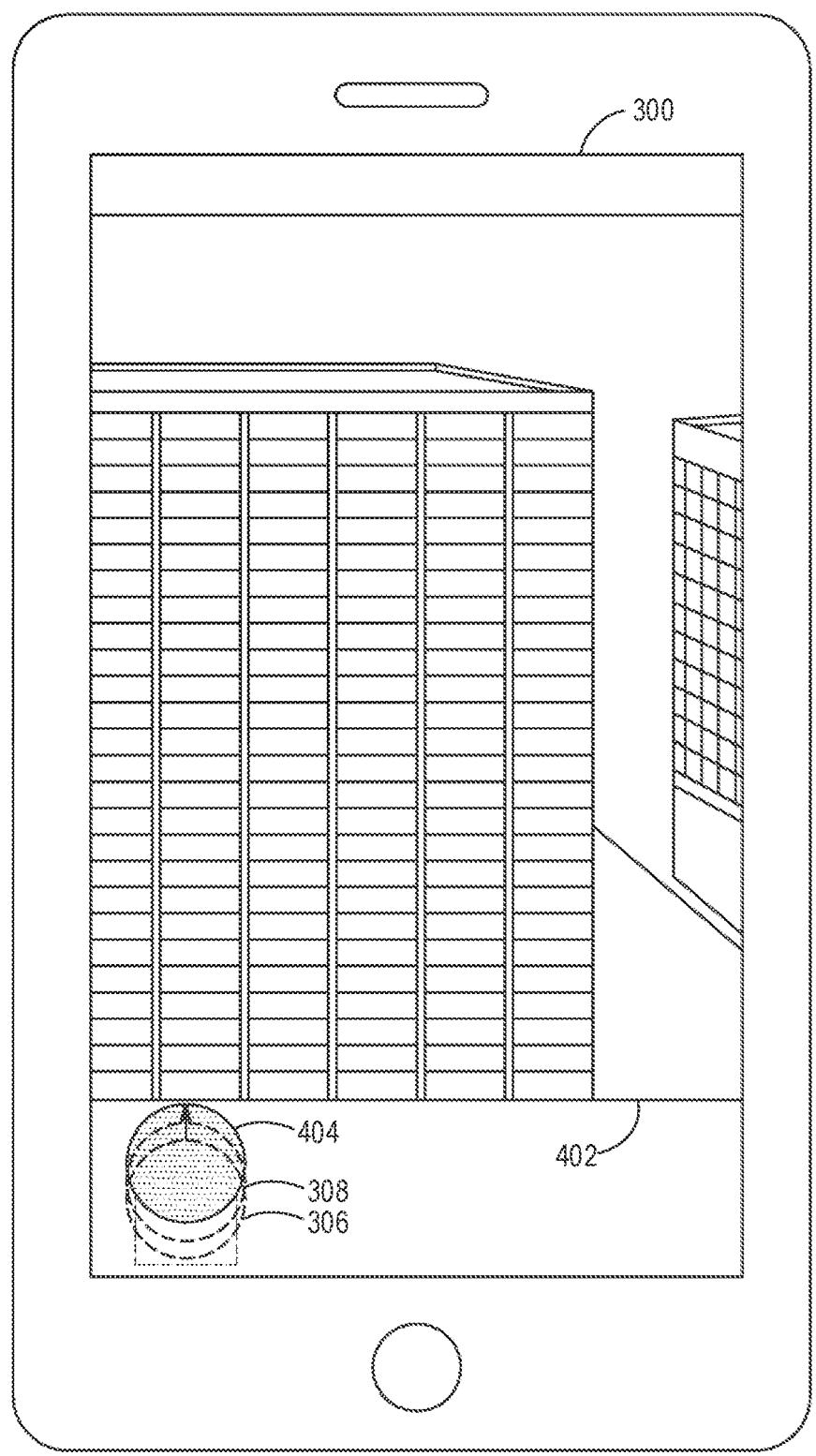

FIG. 4 illustrates a zoomed view 402 of the review interface 300. The zoomed view 402 may be presented by the image review application 108 in response to receiving an indication that the touch input has continued, without breaking contact, to a third position 404. Although the third position 404 is illustrated above the second position 308, the third position may be in a variety of locations. For example, the third position may to the right of the second position 308.

The zoomed view 402 may be a zoomed-in portion of the enlarged preview. For example, the zoomed-in region illustrated in FIG. 4 corresponds to building in the upper-left corner of the enlarged preview 302. The zoomed-in portion may be determined in a number of ways. Thus, a user may be able to, using a single touch input, see the composition of a recently taken image using the enlarged preview and check the sharpness of the image using the zoomed view.

For example, the image review application 108 may retrieve metadata associated with the displayed enlarged preview to determine the zoomed-in portion. The metadata may include information on what region the optical sensor 126 focused when capturing the image data. The region may be defined by a set of coordinates in the image data (e.g., four points that create a box or a single point) The zoomed-in portion may be based on this focused region. For example, if the metadata indicates that a 200 by 200 pixel area was the focus region, the zoomed-in region may display that region without surrounding areas. In various examples, areas surrounding the focus region are also included in the zoomed-in portion. For example, an additional 200 pixels may be added to the width and height of the focus region.

In an example, the image review application 108 may dynamically determine the zoomed-in region based on characteristics of the image data. For example, if people are present in the image data, the zoomed-in region may be a close-up of one or more people in the image. If the characteristics of the image indicate that only a single person is in the image, the zoomed-in region may be the face of the person.

In various examples, the locations of the touch screen display 102 that trigger the zoomed view 402 are set by the image review application 108. For example, there may be certain threshold locations that trigger the enlarged preview 302 and the zoomed view 402. By way of example, consider the situation in which a continuous swipe gesture moves away from the recall portion 204 and towards the top of the touch screen display 102 (as illustrated in FIGS. 3 and 4). If the touch input passes a first vertical threshold, the enlarged preview 302 may be displayed and if the touch input continues and passes a second vertical threshold, the zoomed view 402 may be displayed.

In various examples, the zoomed view 402 may be triggered without the swipe gesture continuing to the third position 404. Instead, the zoomed view 402 may be triggered if contact is maintained at the same or substantially the same location as the second position for a certain amount of time. If, as described above, the enlarged preview is displayed based on a touch-and-hold gesture made on the recall portion 204, the zoomed view 402 may be displayed if the touch-and-hold gesture is continued for a set amount of time. Accordingly, a user may first see the enlarged preview 302 for a moment and then see the zoomed view 402.

In yet a thither example, the zoomed view 402 enables display of dynamically changing zoom level through detection of a gesture, such as a touch input that continues past the second vertical threshold discussed above and then moves between the second vertical threshold and a third vertical threshold. In this example, the zoom level is proportional to the distance from the second vertical threshold with maximum zoom achieved at the third vertical threshold. The dynamic zoom function can be invoked through detection of various gestures or auxiliary inputs, such as a keyboard input in coordination with continuation of a touch gesture (e.g., swipe and hold with activation of plus or minus key).

Figure 5:
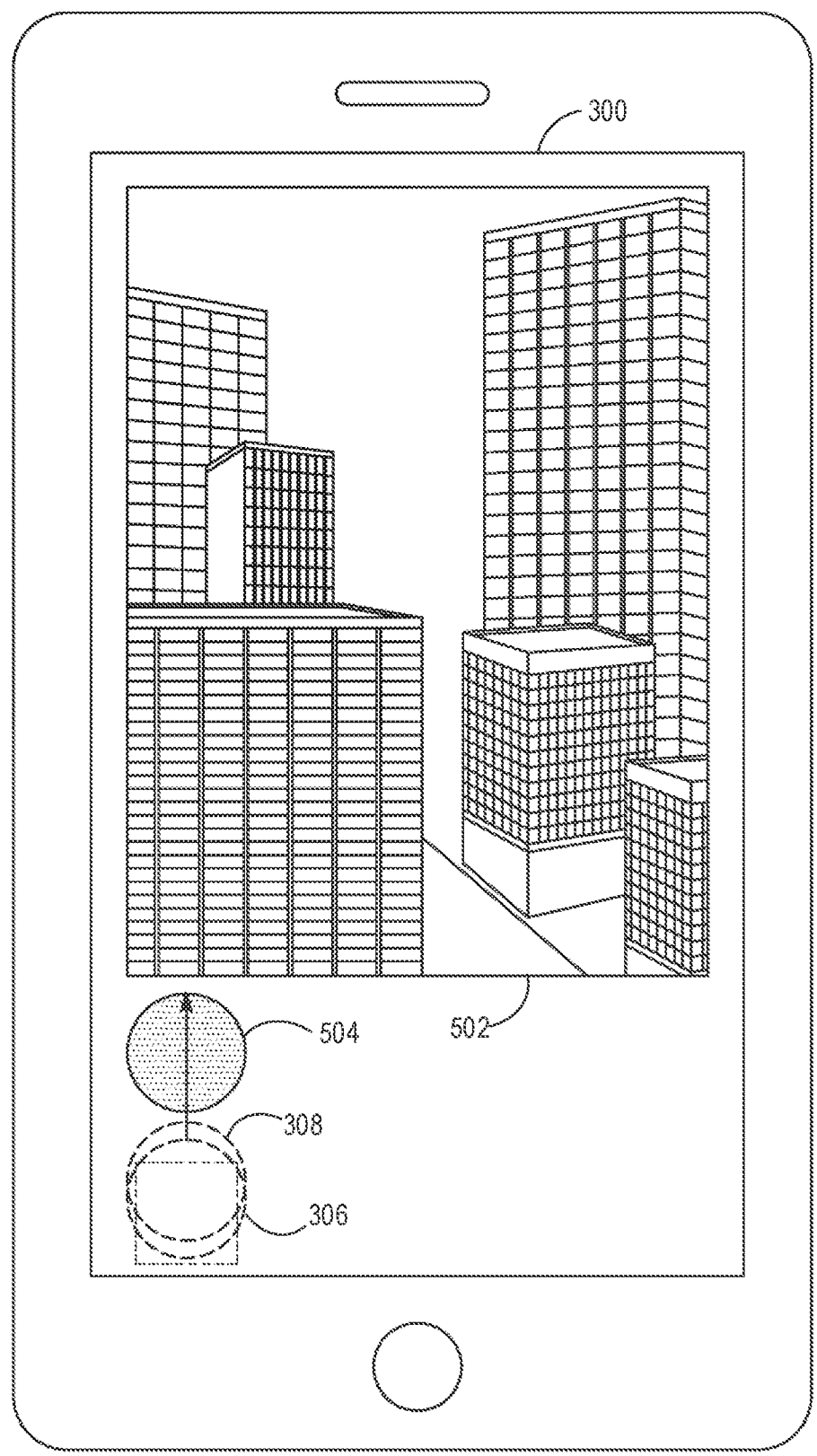

FIG. 5 illustrates a resized enlarged preview 502 of the review interface 300, in an example embodiment. In various examples, the contact position of the user with the touch screen display 102 may change while presenting the enlarged preview 302—potentially obscuring the view of the enlarged preview 302 by the user's finger or stylus. In order to allow the user to fully see the most recently taken image data, the enlarged preview 302 may be resized and/or its displayed position changed.

For example, as discussed above with reference to FIG. 3, the enlarged preview 302 may be presented in response to a touch input that begins at position 306 and continues to position 308. The contact module 132 may detect that the touch input continues, with the user maintaining contact with touch screen display 102, to a third position 504. The contact module 132, in conjunction with the event module 134 may indicate to the image review application 108 the location of the third position. In response, the image review application 108 may dynamically resize the enlarged preview such that the locations of the enlarged preview (e.g., as defined by the corners of the preview) do not overlap with the third position 504. Additionally, the image review application 108 may maintain the aspect ratio of the image data—allowing the user to still see the entirety of the recently taken image, but in a smaller preview such as resized enlarged preview 502.

The image review application 108 may also implement variations of the above to ensure that the largest preview is available to a user. For illustration purposes, assume a coordinate system of the user interface in which [0,0] is the lower left and [X, Y] is the upper right. Thus, for example, if the third position is located above ½ Y, the resized enlarged preview may be presented below the third position. Similarly, if the third position is to the right of ½ X and above a certain Y value, the resized preview may be shown to the left of the third position. The image review application 108 may iterate through the possible positions for display of the resized preview to determine the location that has the largest size. In various example, the image review application 108 does not change the location of the resized enlarged preview relative to the third position (e g., the preview stays above the third position) and instead becomes smaller as the third position approaches an edge of the touch screen display 102.

Figure 6:
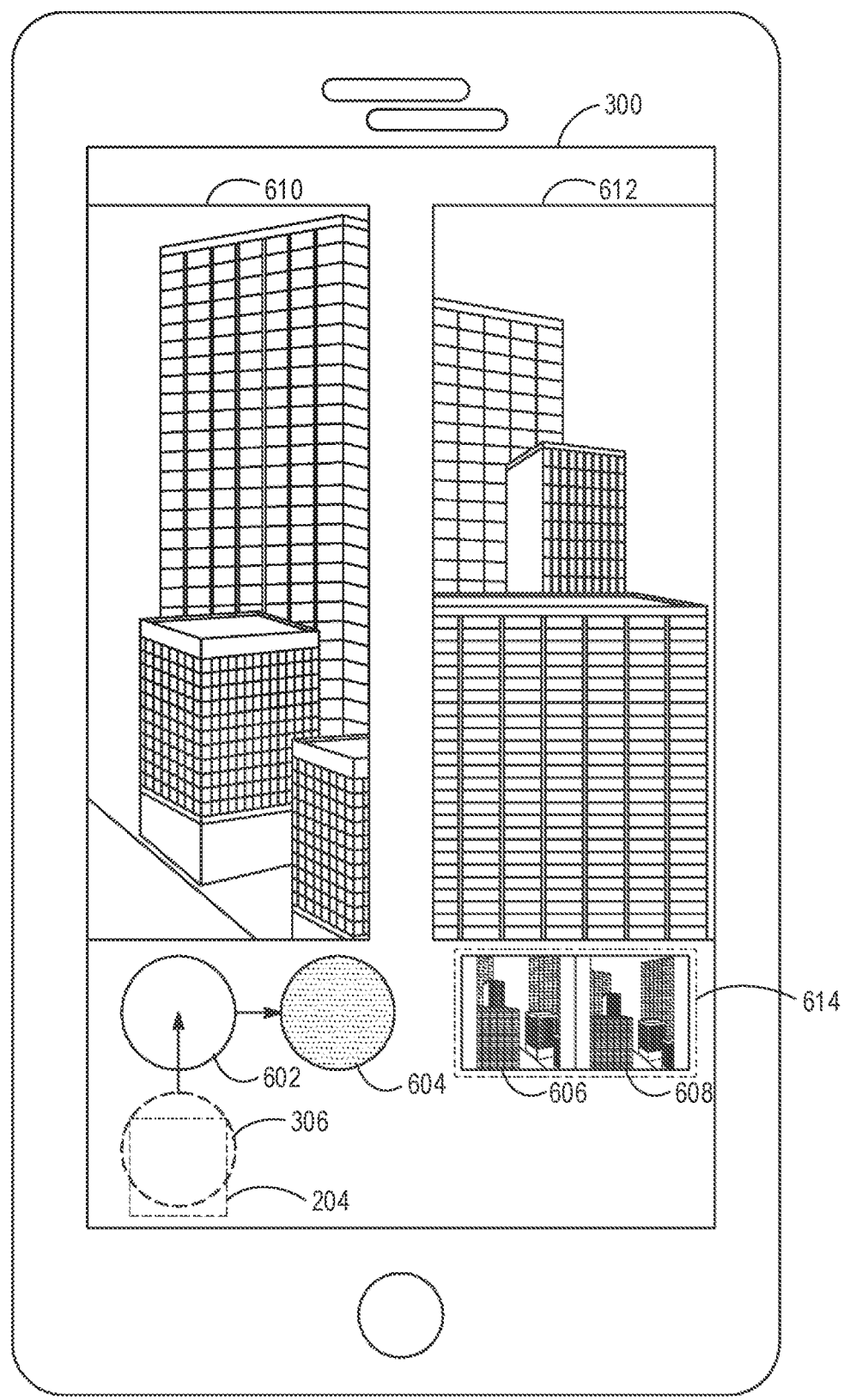

FIG. 6 illustrates a timeline view of the review interface 300, in an example embodiment. In addition to reviewing the composition and sharpness of the most recently captured image data, a user may wish to see a series of recently taken images (referred to as a burst mode). For example, the image capture application 106 may allow a continuous stream of still images to be taken if the user performs a touch-and-hold gesture on the image capture graphic 206 as illustrated in FIG. 2. The user may wish to quickly review these images to ensure at least one of the images is of sufficient quality. While the following function may be logically related to burst mode captured images, the basic functionality can be used to review any sequence of recently taken images.

With reference back to FIG. 6, a timeline view of the review interface 300 may include first and second thumbnail previews 606 and 608 that correspond to first and second enlarged previews 610 and 612, respectively. The first and second thumbnail previews 606 and 608 may be part of a thumbnail review panel 614. The number of thumbnail previews available for display in the thumbnail review panel 614 may be determined according to the number of images taken in the most recent burst mode. Thus, if five images were taken in the burst mode, five thumbnail previews may be available for display in the thumbnail review panel 614. However, however, only a subset of the available previews may be displayed depending on the size of the thumbnail previews (e.g., the dimensions of the previews may exceed the available screen width). In various examples, the number of thumbnail previews available is based on how recent a previously captured image is compared to when the timeline view is presented. For example, pictures that were taken with 30 seconds of the timeline view being presented may be available. The time a picture was taken may be determined by examining stored metadata (e.g., EXIF data).

The timeline view may be presented in response to the contact module 132 detecting a touch input at the first position 306 that continues to a second position 602 and then to a third position 604 that is substantially orthogonal to the direction between the first and second positions. The degree to which the third position is orthogonal to the direction between the first and second positions is configurable, but in an example is within +/−5 degrees. In other example, the third position can be considered orthogonal to the direction of the first and second positions merely by being offset horizontally more than a pre-defined distance, such as 5% of the width of the touch input device.

The positions and directions are illustrated in FIG. 6 are for illustration purposes and other positions may be used. For example, the second position may be to the right of the recall portion and then the third position may be above the second position. The orthogonal direction is only an example, and other directions may be used to trigger the timeline view. In various examples only two positions are needed to present the review interface (e.g., it may be presented in response to a gesture from the first position to the second position, but in a direction different than the direction for activation of the review interface 302).

In various examples, as the touch input continues without breaking contact, in the direction from the second position 602 towards the third position 604, less of the first enlarged preview 610 is presented and more of the second enlarged preview 612 is presented. As the touch input continues the first enlarged preview 610 may no longer be presented and the entire second enlarged preview 612 may be presented. If the touch input continues back towards the second position, the first enlarged preview may be shown again. Alternatively, if the touch input continues in the direction of the second position, portion or a third enlarged preview and a portion of the second enlarged preview may be displayed. In an example, the thumbnail previews in thumbnail review panel 614 may be updated based on the enlarged previews shown (e.g., if the third enlarged preview of an image is displayed, a thumbnail preview of the image may be displayed in thumbnail review panel 614.)

Figure 7:
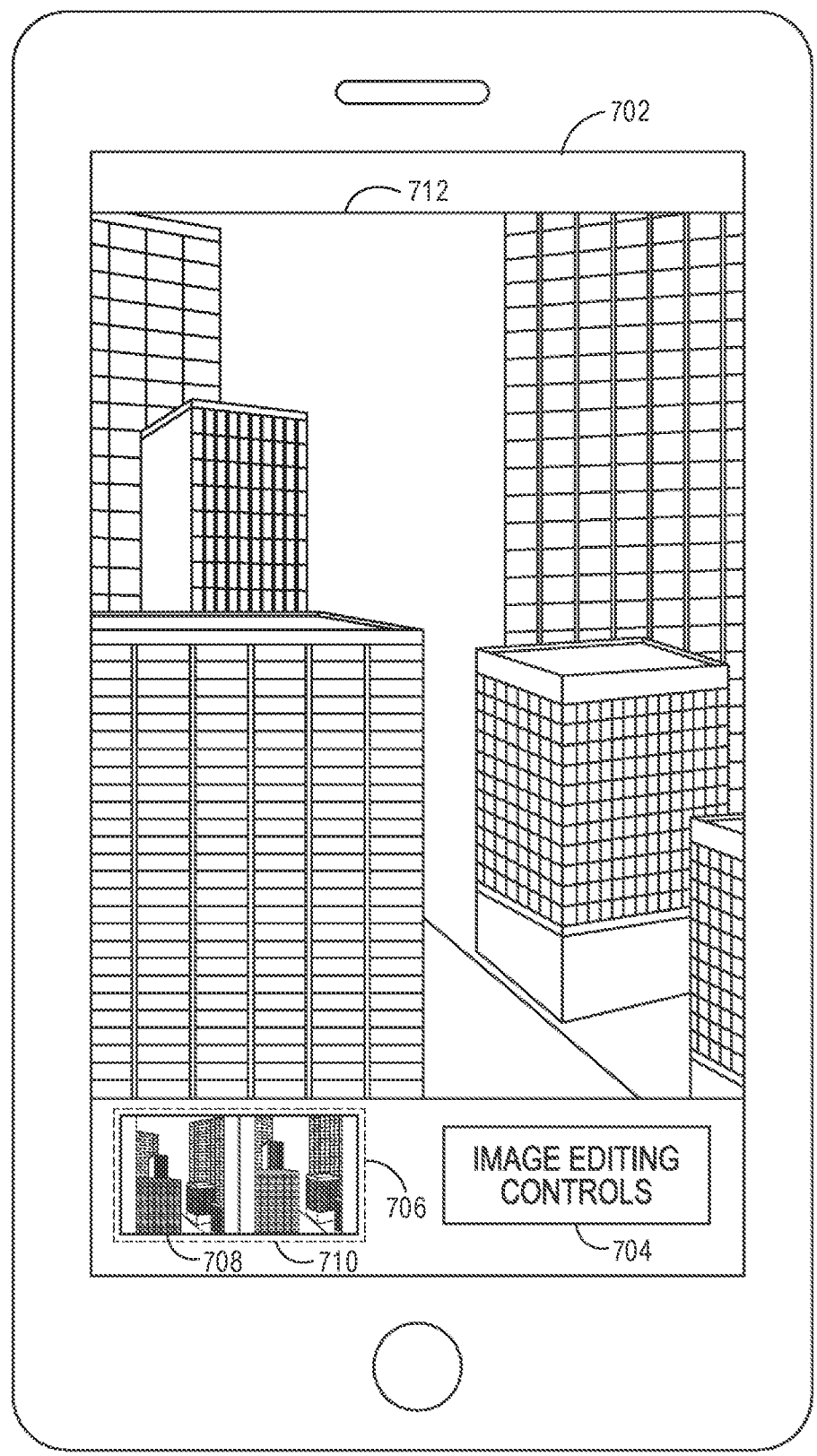
FIG. 7 illustrates an image editing interface, according to various embodiments.

FIG. 7 illustrates an image editing interface 702, according to an example embodiment. The image editing interface 702 may be part of the image editing application 110. The image editing interface 702 may include image editing controls 704 (e.g., brightness, contrast, filters), a thumbnail review panel 706 with first and second thumbnail previews 708 and 710, and an enlarged preview 712 corresponding to the first thumbnail preview 708. The image editing interface 702 may be displayed in response to the user breaking contact with the touch screen 102 while reviewing images as discussed with respect to FIGS. 3-6. For example, if a user lifts his/her finger from substantially the same position as position 308 as depicted in FIG. 3, position 404 as depicted in FIG. 4, or position 504 as depicted in FIG. 5, the user may be brought to an interface such as illustrated in FIG. 7. Alternatively, if the touch input continues to a position substantially the same as the starting position (e.g., position 306), an interface of image capture application 106 may be displayed.

In an example, a user may return to an interface of the image capture application 106 from the image editing interface 702 by initiating a swiping gesture in an outward direction that begins on the enlarged preview. In an example outward means substantially orthogonal to the orientation of the preview. Thus, with respect to image editing interface 702, outward may mean towards the top or bottom of the touch screen 102. If the user initiates a swipe gesture substantially in the same direction as the orientation (e.g., left or right), a different enlarged preview may be presented.

Other directions may also be used to trigger the return to the image capture application. In other examples, a user returns to an interface of the image capture application by initiating a swiping gesture from the enlarged preview towards a location of the thumbnail preview, such as recall portion 204, or other specific user interface element displayed within the image editing interface 702.

Figure 8:
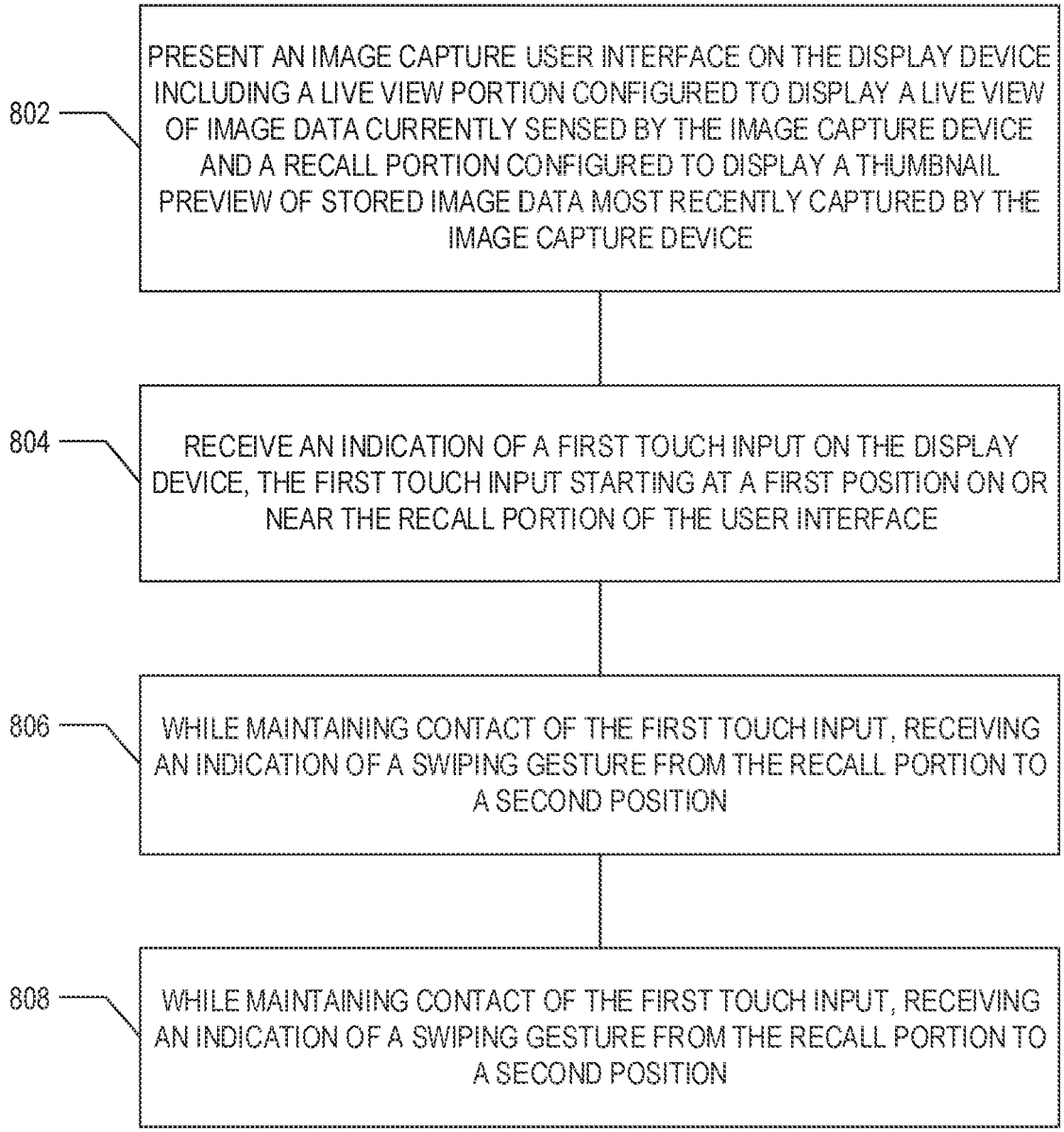
FIG. 8 illustrates a flowchart of a method to review recently captured image data, according to various embodiments.

FIG. 8 illustrates a flowchart of a method to review recently captured image data, according to various embodiments. At operation 802, an image capture user interface may be displayed on a display device of a mobile device. The image capture user interface may include a live view portion configured to display a live view of image data currently sensed by an image capture device and a recall portion configured to display a thumbnail preview of stored image data most recently captured by the image capture device. The image capture device may be an optical sensor of the mobile device.

At operation 804, a program executing on the mobile device may receive an indication of a first touch input on the display device. The touch input may have a starting at a first position on or near the recall portion of the user interface.

At operation 806, while maintaining contact of the first touch input, an indication may be received of a swiping gesture from the recall portion to a second position of the display device.

At operation 808, in response to the first touch input, an enlarged preview of the stored image data may be displayed. The enlarged preview may be larger in size than the thumbnail preview.

Other operations may also be performed. For example, after displaying the enlarged preview, an indication of a discontinuity of contact of the first touch input on the display device may be received. The discontinuity contact may be at substantially the second position. Based on the receiving, an image editing interface may be displayed, the image editing interface including the stored imaged data associated with the enlarged preview. Then, an indication may be received within the editing interface of a second touch input starting at a third position on the enlarged preview and in an outward direction with respect to the enlarged preview. In response to the second touch input, the image capture interface may be displayed.

Another operation may include after displaying the enlarged preview and while maintaining contact of the first touch input, receiving an indication of swiping away from essentially the second position towards the recall portion. In response to receiving the indication of swiping away, display of the enlarged preview may be removed.

Another operation may include after displaying the enlarged preview, determining that the first touch input has continued in a direction towards the enlarge preview. In response to the determining, the enlarged preview may be resized such that the current position of the touch input and the enlarged preview do not overlap.

Another operation may include after displaying the enlarged preview, while maintaining contact of the first touch input, receiving an indication that that the swipe gesture has continued to a third position. In response to the receiving the indication that the swipe gesture has continued, a portion of the enlarged preview and a portion of image data previously captured by the image capture device that is different than the stored image data most recently captured by the image capture device may simultaneously be displayed. While receiving an indicating that the touch input has been maintained and that that the swipe gesture has continued to a fourth position, ceasing display of the enlarged preview.

Another operation may include after displaying the enlarged preview, waiting a predetermined amount of time; and if contact of the first touch is maintained during the predetermined amount of time, zooming into a location of the enlarged preview. The location may be determined based on an area focused on by the image capture device during capture of the stored image data. Furthermore, the image data may be analyzed to determine if a person is present in the enlarged preview, if it is so determined, the location may be set to the person's face.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
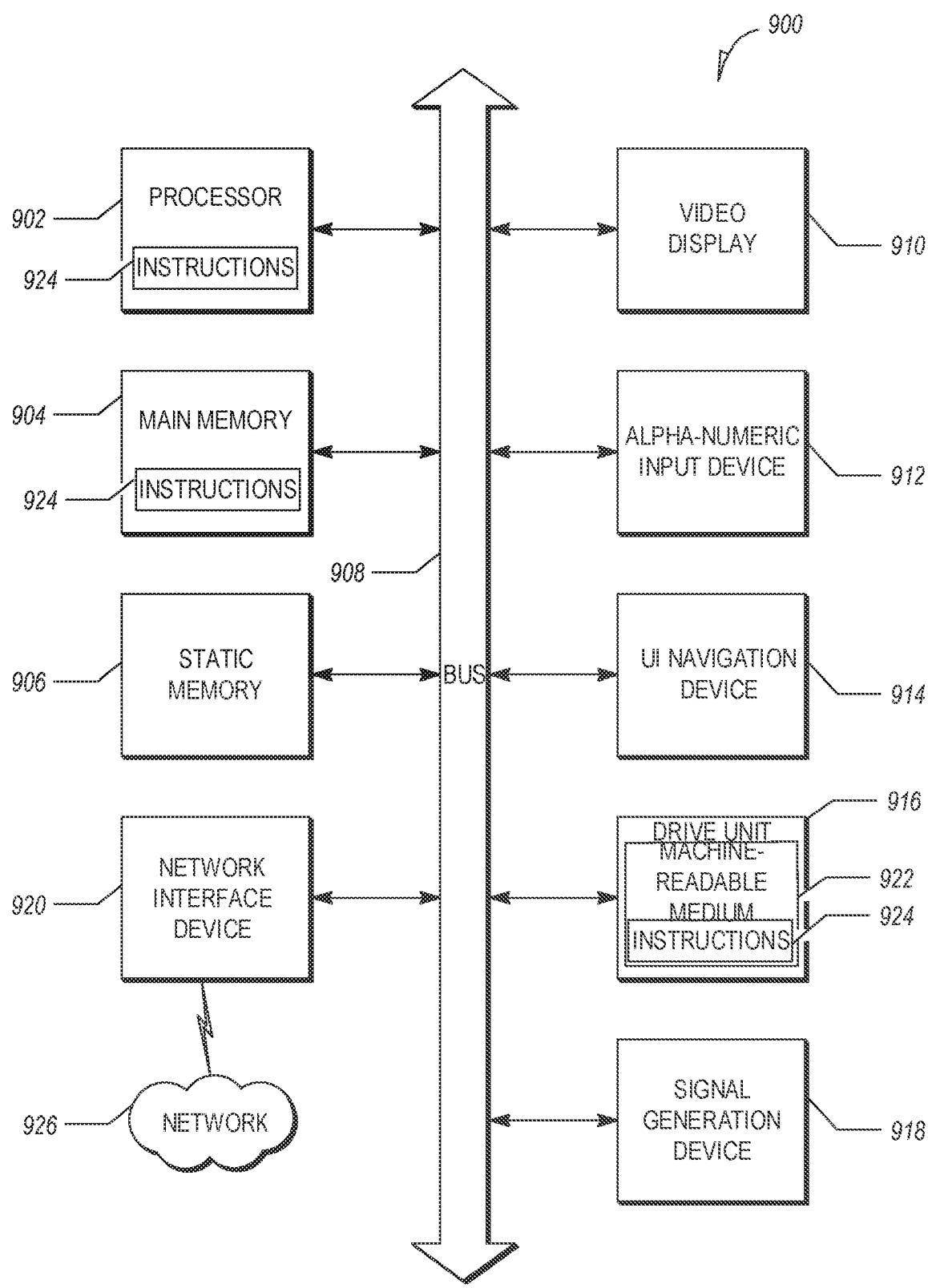
FIG. 9 is a block diagram illustrating an example machine upon which any one or more of the techniques (e.g., methodologies) discussed herein may be performed, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 905, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 9G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
    at least one processor;
    an image capture device;
    a display device; and
    a storage device with instructions, which when executed by the at least one processor, cause the at least one processor to perform operations comprising:
    presenting an image capture user interface on the display device including:
        (a) a recall portion configured to display a thumbnail preview of stored image data captured by the image capture device, and (b) a timeline preview portion configured to display one or more enlarged previews of selected image data from the stored image data;
    receiving an indication of a first touch input on the display device, the first touch input starting at a first thumbnail preview displayed in the recall portion;
    while maintaining contact of the first touch input:
        receiving an indication of a first swiping gesture moving in a first direction from the first thumbnail preview to a second position toward the timeline preview portion;
        in response to the first swiping gesture, displaying a first enlarged preview of stored image data corresponding to the first thumbnail preview, the first enlarged preview being larger in size than the first thumbnail preview; and
        in response to receiving an indication of a second swiping gesture moving in a second direction different from the first direction, performing an action to the first enlarged preview.

2. The system of claim 1, wherein the action comprises moving the first enlarged preview in a direction substantially normal to the first direction revealing a second enlarged preview corresponding to a second thumbnail preview positioned adjacent the first thumbnail preview in the recall portion.

3. The system of claim 2, wherein the operations further comprise:
    in response to receiving an indication of a discontinuity of contact of the first touch input on the display device at substantially the second position while displaying the first enlarged preview: displaying an image editing interface, the image editing interface including the stored image data associated with the first enlarged preview.

4. The system of claim 3, wherein the operations further comprise:
    within the editing interface, receiving an indication that a second touch input starting at a third position on the first enlarged preview that moves in an outward direction with respect to the first enlarged preview; and
    in response to receiving, within the editing interface, the indication of the second touch input, displaying an image capture interface including a live view portion configured to display a live view of image data currently sensed by an image capture device of the system.

5. The system of claim 2, wherein the operations further comprise:
    after displaying the first enlarged preview, while maintaining contact of the first touch input, receiving an indication of a third swiping gesture continuing from the second position to a third position located in a direction toward the first thumbnail preview; and
    in response to receiving the indication of the third swiping gesture continuing from the second position to the third position:
        moving the second enlarged preview off the display device in the direction substantially normal to the first direction; and
        simultaneously displaying a portion of the first enlarged preview and a portion of a third enlarged preview corresponding to a third thumbnail preview positioned adjacent the first thumbnail preview on an opposite side as the second thumbnail preview in the recall portion.

6. The system of claim 5, wherein the operations further comprise:
    in response receiving an indication of a fourth swiping gesture continuing from the third position to a fourth position while maintaining contact of the first touch input, ceasing display of the first enlarged preview.

7. The system of claim 1, wherein the operations further comprise:
    in response to determining that the first touch input, after receiving the second swiping gesture, has continued in a direction toward the first enlarged preview, dynamically resizing the first enlarged preview proportional to movement of the first touch input toward the first enlarged preview.

8. The system of claim 1, wherein the action comprises displaying at least a portion of the first enlarged preview and at least a portion of an enlarged preview of another image selected from a set of images captured in burst mode, wherein the set of images captured in burst mode comprises the stored image data corresponding to the first thumbnail preview.

9. The system of claim 8, wherein the second direction is substantially orthogonal to the first direction, and wherein the operations further comprise:
in response to receiving an indication of a discontinuity of contact of the first touch input on the display device at a position relating to the first enlarged preview:
choosing to retain the stored image data corresponding to the first thumbnail preview; and
discarding other image data relating to remaining images in the set of images captured in burst mode.

10. A non-transitory computer-readable medium comprising instructions, which when executed by at least one processor, cause the at least one process to perform operations comprising:
presenting an image capture user interface on a display device of a multipurpose device including:
(a) a recall portion configured to display a thumbnail preview of stored image data captured by the image capture device, and (b) a timeline preview portion configured to display one or more enlarged previews of selected image data from the stored image data;
receiving an indication of a first touch input on the display device, the first touch input starting at a first thumbnail preview displayed in the recall portion;
while maintaining contact of the first touch input:
receiving an indication of a first swiping gesture moving in a first direction from the first thumbnail preview to a second position toward the timeline preview portion;
in response to the first swiping gesture, displaying a first enlarged preview of stored image data corresponding to the first thumbnail preview, the first enlarged preview being larger in size than the first thumbnail preview; and
in response to receiving an indication of a second swiping gesture moving in a second direction different from the first direction, performing an action to the first enlarged preview.

11. The non-transitory computer-readable medium of claim 10, wherein the action comprises displaying at least a portion of the first enlarged preview and at least a portion of an enlarged preview of another image selected from a set of images captured in burst mode, wherein the set of images captured in burst mode comprises the stored image data corresponding to the first thumbnail preview, and wherein the second direction is substantially orthogonal to the first direction.

12. A method comprising:
presenting an image capture user interface on a display device of a multipurpose device including:
(a) a recall portion configured to display a thumbnail preview of stored image data captured by the image capture device, and (b) a timeline preview portion configured to display one or more enlarged previews of selected image data from the stored image data;
receiving an indication of a first touch input on the display device, the first touch input starting at a first thumbnail preview displayed in the recall portion;
while maintaining contact of the first touch input:
receiving an indication of a first swiping gesture moving in a first direction from the first thumbnail preview to a second position toward the timeline preview portion;
in response to the first swiping gesture, displaying a first enlarged preview of stored image data corresponding to the first thumbnail preview, the first enlarged preview being larger in size than the first thumbnail preview; and
in response to receiving an indication of a second swiping gesture moving in a second direction different from the first direction, performing an action to the first enlarged preview.

13. The method of claim 12, wherein the action comprises moving the first enlarged preview in a direction substantially normal to the first direction revealing a second enlarged preview corresponding to a second thumbnail preview positioned adjacent the first thumbnail preview in the recall portion.

14. The method of claim 13, further comprising:
in response to receiving an indication of a discontinuity of contact of the first touch input on the display device at substantially the second position while displaying the first enlarged preview: displaying an image editing interface, the image editing interface including the stored image data associated with the first enlarged preview.

15. The method of claim 14, further comprising:
within the editing interface, receiving an indication that a second touch input starting at a third position on the first enlarged preview that moves in an outward direction with respect to the first enlarged preview; and
in response to receiving, within the editing interface, the indication of the second touch input, displaying an image capture interface including a live view portion configured to display a live view of image data currently sensed by an image capture device of the multipurpose device.

16. The method of claim 13, further comprising:
after displaying the first enlarged preview, while maintaining contact of the first touch input, receiving an indication of a third swiping gesture continuing from the second position to a third position located in a direction toward the first thumbnail preview; and
in response to receiving the indication of the third swiping gesture continuing from the second position to the third position:
moving the second enlarged preview off the display device in the direction substantially normal to the first direction; and
simultaneously displaying a portion of the first enlarged preview and a portion of a third enlarged preview corresponding to a third thumbnail preview positioned adjacent the first thumbnail preview on an opposite side as the second thumbnail preview in the recall portion.

17. The method of claim 16, further comprising:
in response receiving an indication of a fourth swiping gesture continuing from the third position to a fourth position while maintaining contact of the first touch input, ceasing display of the first enlarged preview.

18. The method of claim 12, further comprising:
in response to determining that the first touch input, after receiving the second swiping gesture, has continued in a direction toward the first enlarged preview, dynamically resizing the first enlarged preview proportional to movement of the first touch input toward the first enlarged preview.

19. The method of claim 12, wherein the action comprises displaying at least a portion of the first enlarged preview and at least a portion of an enlarged preview of another image selected from a set of images captured in burst mode, wherein the set of images captured in burst mode comprises the stored image data corresponding to the first thumbnail preview.

20. The method of claim 19, wherein the second direction is substantially orthogonal to the first direction, and wherein the method further comprises:
- in response to receiving an indication of a discontinuity of contact of the first touch input on the display device at a position relating to the first enlarged preview:
  - choosing to retain the stored image data corresponding to the first thumbnail preview; and
  - discarding other image data relating to remaining images in the set of images captured in burst mode.

* * * * *